(12) United States Patent
Kim et al.

(10) Patent No.: US 10,853,278 B2
(45) Date of Patent: Dec. 1, 2020

(54) MEMORY SYSTEM

(71) Applicant: SK hynix Inc., Icheon (KR)

(72) Inventors: Sun Woong Kim, Hwaseong (KR); Eui Cheol Lim, Hwaseong (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/367,700

(22) Filed: Mar. 28, 2019

(65) Prior Publication Data

US 2020/0026669 A1 Jan. 23, 2020

(30) Foreign Application Priority Data

Jul. 23, 2018 (KR) .................. 10-2018-0085506
Dec. 6, 2018 (KR) .................. 10-2018-0155681

(51) Int. Cl.
*G06F 3/06* (2006.01)
*G06F 9/50* (2006.01)
*G06F 13/16* (2006.01)
*G06F 13/24* (2006.01)

(52) U.S. Cl.
CPC .......... *G06F 13/1668* (2013.01); *G06F 13/24* (2013.01)

(58) Field of Classification Search
None
See application file for complete search history.

(56) References Cited

U.S. PATENT DOCUMENTS

| | | |
|---|---|---|
| 5,757,795 A | 5/1998 | Schnell |
| 7,899,052 B1 | 3/2011 | Hao et al. |
| 9,952,925 B2 | 4/2018 | Lea et al. |
| 9,983,821 B2 | 5/2018 | Sala et al. |
| 2013/0265883 A1 | 10/2013 | Henry et al. |
| 2014/0115579 A1* | 4/2014 | Kong ..................... G06F 3/0665 718/1 |
| 2014/0208022 A1* | 7/2014 | Gordon ............... G06F 11/1076 711/114 |
| 2016/0283303 A1* | 9/2016 | Sharma .................. G06F 11/079 |
| 2017/0091003 A1* | 3/2017 | Das Sharma ....... G06F 13/4282 |
| 2017/0358327 A1 | 12/2017 | Oh et al. |
| 2017/0364287 A1* | 12/2017 | Antony ................. G06F 3/0685 |
| 2017/0364428 A1* | 12/2017 | Ganesan ............. G06F 11/2058 |
| 2018/0225254 A1* | 8/2018 | Hu ....................... G06F 9/45558 |
| 2020/0026469 A1* | 1/2020 | Gao ....................... G06F 3/0653 |

FOREIGN PATENT DOCUMENTS

EP 0464848 A2 1/1992

* cited by examiner

*Primary Examiner* — Hyun Nam

(57) ABSTRACT

A memory system is disclosed, which relates to technology for an accelerator of a high-capacity memory device. The memory system includes a plurality of memories configured to store data therein, and a pooled memory controller (PMC) configured to perform map computation by reading the data stored in the plurality of memories and storing resultant data produced by the map computation in the plurality of memories.

17 Claims, 7 Drawing Sheets

MEMORY SYSTEM

CROSS-REFERENCE TO RELATED APPLICATION

This application claims priority based upon Korean patent application Nos. 10-2018-0085506 filed on Jul. 23, 2018 and 10-2018-0155681 filed on Dec. 6, 2018, the disclosure of which is hereby incorporated in its entirety by reference herein.

BACKGROUND OF THE INVENTION

1. Technical Field

Embodiments of the present disclosure may generally relate to a memory system, and more particularly to a technology for a computational accelerator of a high-capacity memory system.

2. Related Art

In recent times, various mobile communication terminals, for example, smartphones, tablet PCs, etc. have been widely used throughout the world. In addition, demand for a Social Network Service (SNS), a Machine to Machine (M2M) service, a sensor network, etc. from anywhere at any time is rapidly increasing. Therefore, the amount of data, the creation speed of data, and diversity of data are geometrically increasing. In order to process big data, a data processing rate of each memory is of importance and a high-capacity memory device and a high-capacity memory module are also needed.

Therefore, a memory system may include a plurality of combined memory devices to overcome physical limitations of each memory device as well as to increase storage capacity of the memory system. For example, a server architecture of a cloud data center may be changed to a structure capable of efficiently executing big-data applications.

In order to efficiently process big data, a pooled memory formed by unification (or combination) of a plurality of memories has recently been used. The pooled memory provides high-capacity and high-bandwidth memories, and may be efficiently used to provide an in-memory database and the like.

BRIEF SUMMARY OF THE INVENTION

Various embodiments of the present disclosure are directed to providing a memory system that substantially obviates one or more issues that result from limitations and disadvantages of the related art.

The embodiments of the present disclosure relate to a memory system having an accelerator contained in a pooled memory, such that the memory system can reduce energy consumption and increase system throughput or performance.

In an embodiment of the present disclosure, a memory system includes a plurality of memories configured to store data therein, and a pooled memory controller (PMC) configured to perform a map computation by reading input data from the plurality of memories and storing resultant data produced by performing the map computation in the plurality of memories.

In accordance with another embodiment of the present disclosure, a memory system includes a fabric network coupled to at least one processor, and a pooled memory having a plurality of memories and a pooled memory controller, the pooled memory being configured to perform packet relay to the processor through the fabric network, and transmit data stored in at least one memory in response to a request from the processor. The pooled memory controller is configured to perform off-loading a map computations by reading input data stored in the at least one memory and storing in the at least one memory resultant data produced by the map computation.

It is to be understood that both the foregoing general description and the following detailed description of the present disclosure are illustrative and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Figure 1:
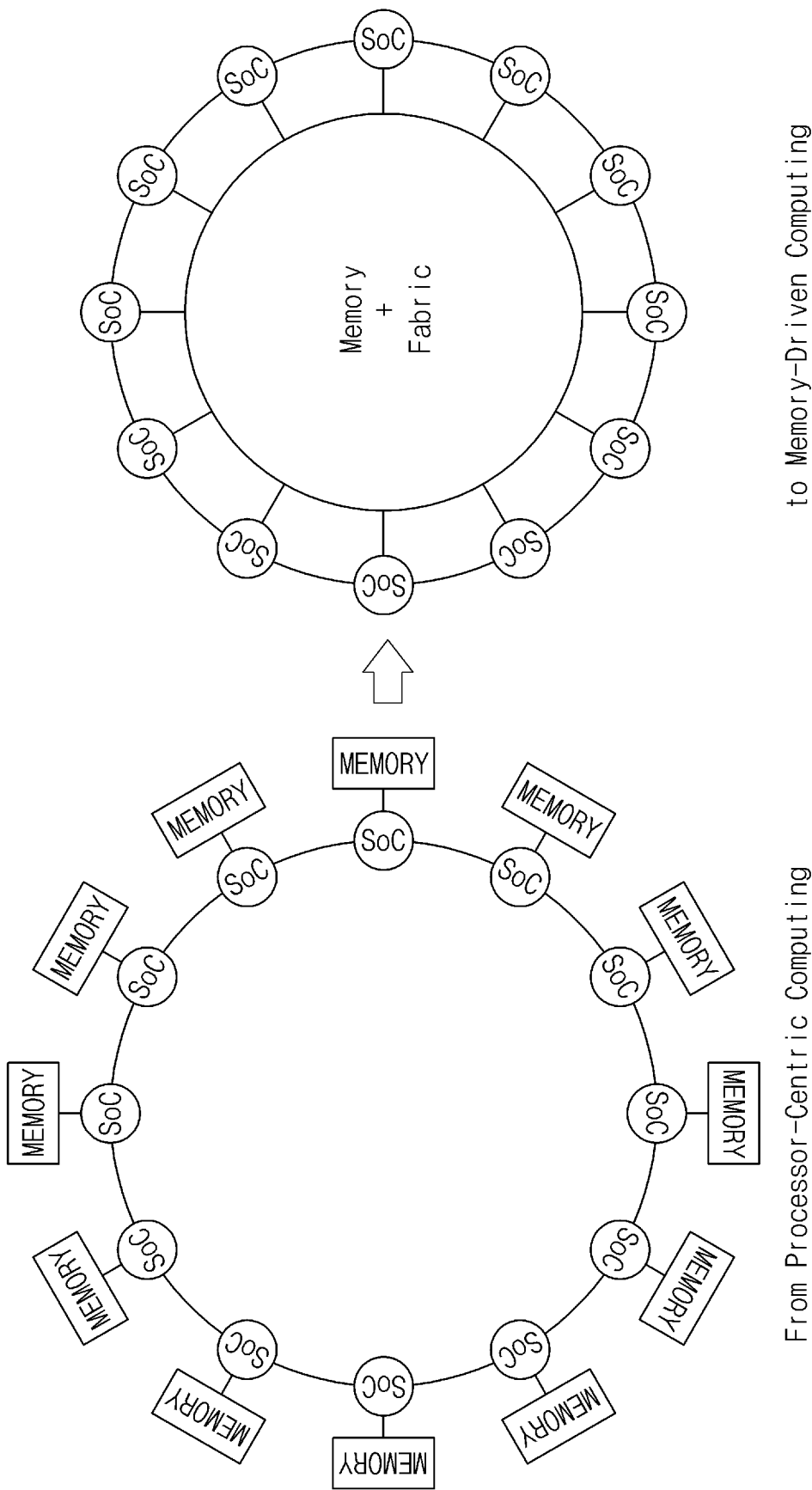
FIG. 1 is a conceptual diagram illustrating a memory system according to an embodiment of the present disclosure.

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, the term "connection or coupling" means that the certain part is directly connected (or coupled) to another part and/or is electrically connected (or coupled) to another part through the medium of a third party. Throughout the specification of the present disclosure, if it is assumed that a certain part includes a certain component, the term "comprising or including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

As data or the amount of data processed by a data center application increases in size, the number of hardware resources required for the data center application also increases. Server architecture has recently evolved to more efficiently employ such hardware resources.

For example, deep learning applications and also a large number of machine learning applications may be executed in a cloud data center. Most of the deep learning applications and the machine learning applications have low temporal locality, such that it is preferable that the deep learning applications and the machine learning applications be arithmetically processed (i.e., computed) using a hardware accelerator (for example, a Graphics Processing Unit (GPU), a Field Programmable Gate Array (FPGA), etc.), instead of a Central Processing Unit (CPU).

In this case, the term "temporal locality" may refer to the degree to which an operation that accesses data once (i.e., once-accessed data or initially-accessed data) is likely to access that data again within a relatively short period of time after completion of the initial access to the data. That is, the above-mentioned applications may predominantly use cold data that has not been accessed for a while, rather than using hot data that is frequently accessed. As a result, the above-mentioned applications may not benefit from the cache memory systems typically employed in CPUs to reduce the effect of the relatively low bandwidth and high latency characteristic of some large memory systems.

An operation process for allowing a processor (e.g., CPU) to perform off-loading of a job to the accelerator will hereinafter be described below. In some cases, data may initially be moved from a local memory of the processor to a local memory of the accelerator. Thereafter, when the accelerator finishes arithmetic processing or computation, the computation result should be transferred to the processor.

However, when the costs (such as delay or power consumption) of such data movement are higher than costs needed for data computation, it is preferable in terms of cost efficiency that an architecture be implemented in which less data needs to be transferred to perform the desired computation. To this end, a memory-driven computing concept has been proposed.

FIG. 1 is a conceptual diagram illustrating an example of a memory system according to an embodiment of the present disclosure.

FIG. 1 illustrates a memory-based computing structure for memory driven computing, and how it differs from a System on Chip (SoC)-based (i.e., processor-based) computing structure (i.e., a computing device) for processor-centric computing. In the processor-based computing structure, a single SoC may be coupled to a single memory on a one to one basis.

Memory-driven computing may use a unified memory in which multiple SoCs are coupled to one another through a fabric network. Data communication between the SoCs may be achieved through a memory system bandwidth.

In addition, one unified memory to which multiple SoCs are coupled through the fabric network need not perform typical memory copying to implement data communication between the SoCs. In order to implement commercially available memory-driven computing, a high bandwidth, low latency, coherency, etc. should be supported.

In association with technical fields of the above-mentioned embodiment of the present disclosure, many developers and companies are conducting intensive research into technology for interconnecting transaction-based memory systems.

In association with accelerator technology, various research, for example, Near Data Processing (NDP) or Processing In Memory (PIM), into where to position the accelerator based on workload characteristics has been intensively studied and proposed. In this case, Processing In Memory (PIM) may refer to a memory in which computation logic is closely coupled to memory cells so as to increase a data processing rate and a data transfer rate.

The embodiment of the present disclosure relates to technology of a pooled memory architecture in which multiple memories are combined, and an in-memory database usage appropriate for the pooled memory architecture. The following description will disclose characteristics of a map-reduce application and a method for processing map computation using an accelerator (to be described later) embedded in the pooled memory.

Figure 2:
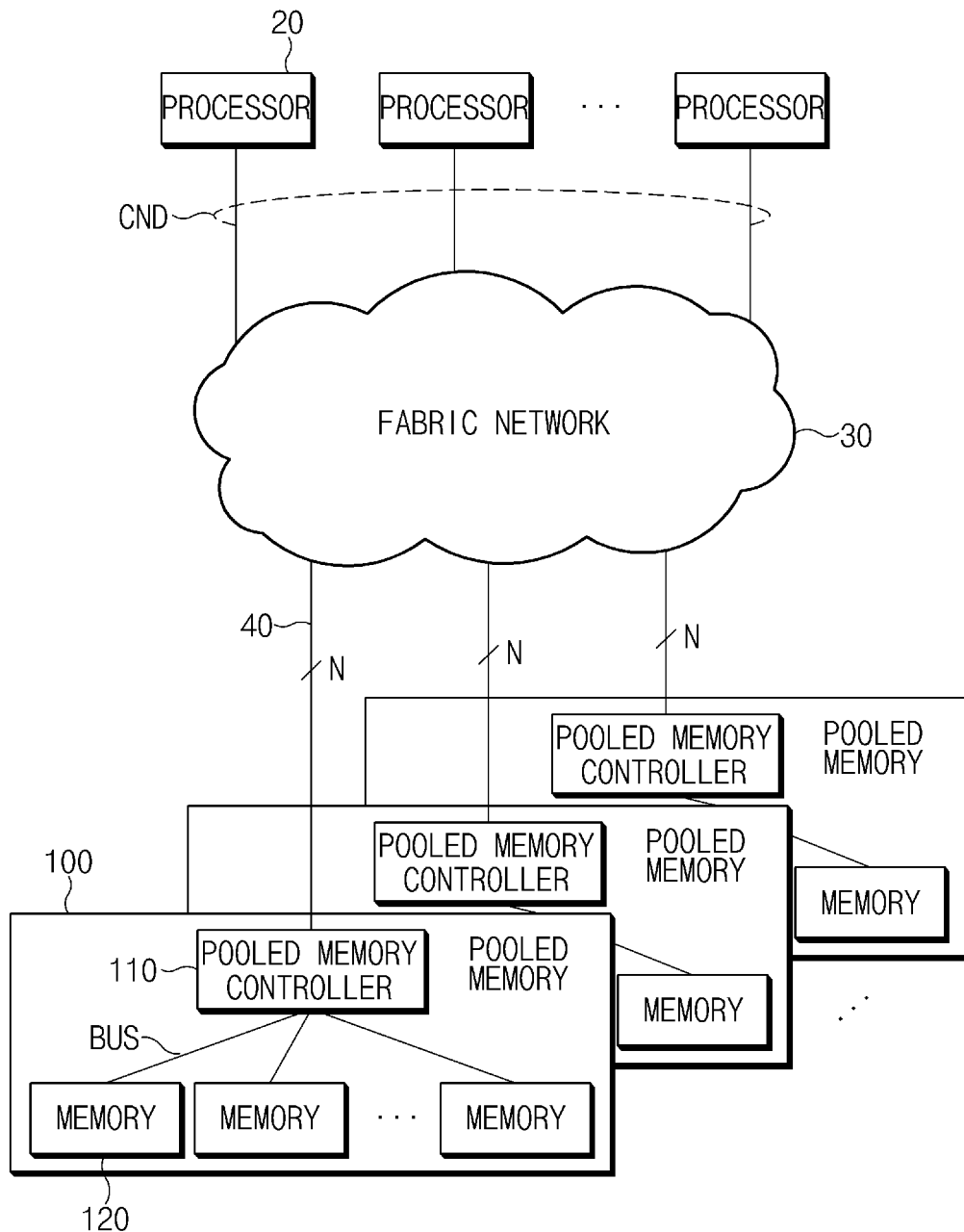
FIG. 2 is a conceptual diagram illustrating a memory system according to an embodiment of the present disclosure.

FIG. 2 is a conceptual diagram illustrating the memory system 10 according to an embodiment of the present disclosure.

The memory system 10 may be based on the above-mentioned memory-driven computing architecture. The memory system 10 may include a plurality of processors (e.g., CPUs) 20, a fabric network 30, a plurality of channels 40, and a plurality of pooled memories (or pooled memory devices) 100. The term "the memory system" is not limited the configuration illustrated in FIG. 2. For example, the memory system may also refer to a system that includes a pooled memory controller and a plurality of memories, where the memory system is coupled to a plurality of processors via a fabric network.

The plurality of processors 20 may be coupled to the fabric network 30 through a node CND (or one or more nodes). The plurality of processors 20 may be coupled to the plurality of pooled memories through the fabric network 30. In an embodiment, one or more of the pooled memory 100 may be coupled to the fabric network 30 through the plurality of channels 40. For example, each of the pooled memories 100 may be coupled to the fabric network 30 through N channels 40, where N is greater than or equal to 1. While FIG. 2 illustrates a single node CND coupling a plurality of processors 20 to the fabric network 30, embodiments are not limited thereto, and in an embodiment, a plurality of nodes may each couple respective pluralities of processors to the fabric network 30. For example, each of the SoCs shown in the Memory-Driven Computing system of FIG. 1 may include a node coupling a plurality of processors to the fabric.

Each of the pooled memories 100 may include a plurality of memories (or memory devices) 120 and a pooled memory controller (PMC) 110 to control the plurality of memories 120. The pooled memory controller (PMC) 110 may be coupled to each memory 120 through a bus (BUS).

Each memory 120 may be directly coupled to the fabric network 30. However, the scope or spirit of the present disclosure is not limited thereto, and the plurality of memories 120 may be provided within a single pooled memory 100, such that the pooled memory 100 directly couples to the fabric network 30, and the plurality of memories 120 indirectly couple to the fabric network 30 through an interface (e.g., the pooled memory controller 110) of the pooled memory 100.

When the pooled memory 100 includes a plurality of memories 120, the pooled memory controller (PMC) 110 may be located between the fabric network 30 and the plurality of memories 120 such that the pooled memory controller (PMC) 110 can manage the respective memories 120. That is, communications between the plurality of memories 120 and the fabric network 30 may be provided by (and, in embodiments, managed by) the pooled memory controller (PMC) 110.

In an embodiment, the pooled memory controller (PMC) 110 may perform memory interleaving to increase throughput, or may support address remapping to increase reliability, availability, serviceability, and so on.

In-memory database may refer to a database management system for storing necessary data in a main memory but not a storage device (e.g., a storage device such as a hard disk drive (HDD) or solid-state drive (SSD)), such that the in-memory database can be rapidly accessed.

A server system of the related arts may have physical difficulty increasing memory storage capacity beyond a predetermined memory capacity. In such a server system, an application cannot allow the size of a database (DB) to be larger than a predefined memory capacity of each server. If the database (DB) is increased in size, data to be stored in the database (DB) should be stored in a plurality of servers in a distributed manner, which may result in system performance being unavoidably degraded by the interconnection process of the plurality of servers. To avoid this, the pooled memory 100 may provide a higher storage capacity and/or a higher bandwidth than the server systems of the related arts, such that the pooled memory 100 can more efficiently support the In-Memory DB than the server systems of the related arts.

Figure 3:
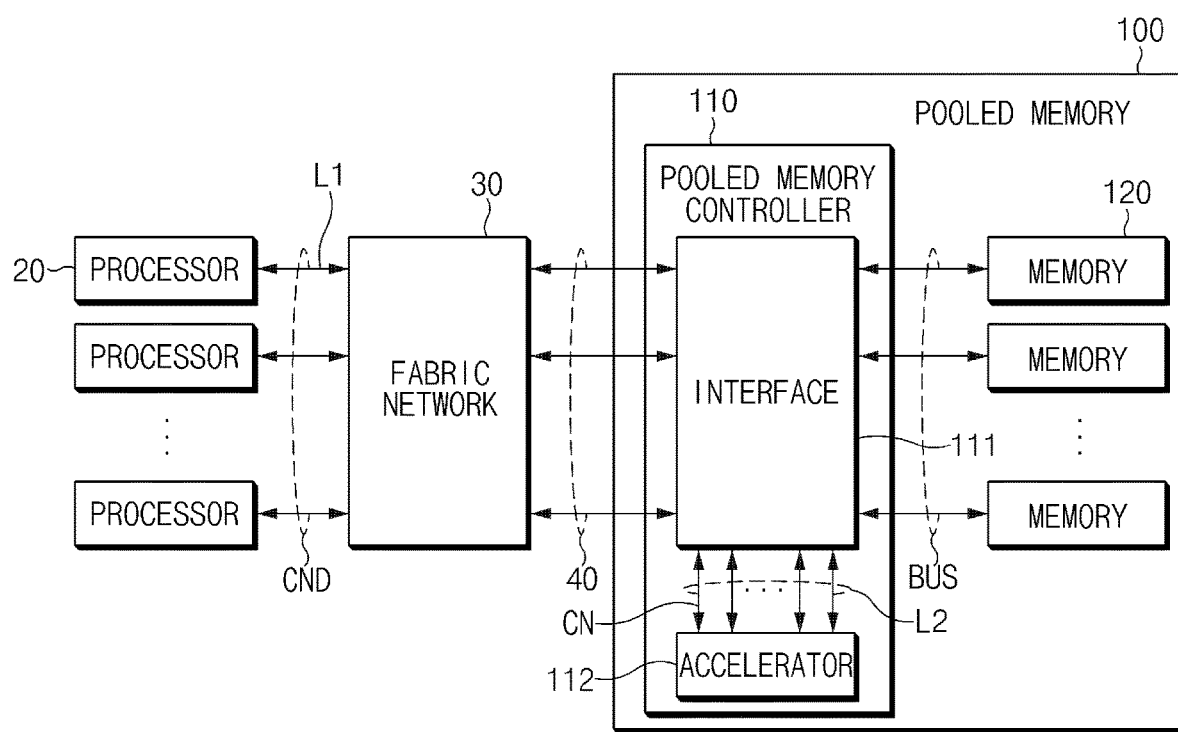
FIG. 3 is a block diagram illustrating a pooled memory controller according to an embodiment of the present disclosure.

FIG. 3 is a block diagram illustrating the pooled memory controller (PMC) 110 shown in FIG. 2 according to an embodiment of the present disclosure.

The pooled memory controller (PMC) 110 may include an interface 111 and an accelerator 112. In this case, the interface 111 may perform packet relay among the fabric network 30, the accelerator 112, and the plurality of memories 120. The interface 111 may be coupled to the accelerator 112 through the plurality of accelerator channels (CN).

The interface 111 according to this embodiment may include a switch to perform such packet relay. This switch may be located among the fabric network 30, the accelerator 112, and the memories 120. Although the embodiment of the present disclosure has illustratively disclosed that the interface 111 includes the switch for more convenient understanding of the present disclosure, the scope or spirit of the present disclosure is not limited thereto, and it should be noted that other technical means needed for such packet relay may also be applied to the present disclosure without difficulty.

The accelerator 112 may perform computation on data received through the interface 111. For example, the accelerator 112 may perform a map computation of data received from one or more memory 120 through the interface 111, and may store the data that results from the map computation (i.e., the resultant data) in one or more memory 120 through the interface 111. In an embodiment, the accelerator 112 is programmable, that is, the accelerator 112 performs the map computation by executing computer programming instructions provided to the accelerator 112 from a non-transitory computer-readable medium.

The above-mentioned embodiment has illustratively discloses one accelerator 112 in the pooled memory controller (PMC) 110 for convenience of description. However, the scope or spirit of the present disclosure is not limited thereto, and it should be noted that a plurality of accelerators 112 may also be included in the pooled memory controller (PMC) 110.

Map-reduce application may refer to a software framework designed to process high-capacity data using distributed parallel computing. This map-reduce application has been used in various kinds of applications. Map computation for use in the map-reduce application may be configured in a manner that, after intermediate information is extracted in the form of Key and Value (Key, Value), reduce computation may collect the extracted intermediate information and then output a desired final result based on the collected information. Typically, "map" refers to an operation that selects and/or sorts data from a database (such as an in-memory database), and "reduce" refers to an operation that performs a computation using the selected and sorted data produced by the map operation as inputs.

For example, assuming that a user of the memory system 10 desires to search for information about "the highest temperature on Earth every year" using the map-reduce application, a map computation may extract year and temperature information by reading information (or "read information") in a text file, and may output a list comprised of pairs of year and temperature (Year, Temperature). The list may include multiple (Year, Temperature) pairs for each year. A reduce application may collect the above-mentioned map computation result, may arrange the collected information in ascending or descending numerical order of temperature values, and may output the (Year, Temperature) pairs having a highest temperature for each year to produce the desired final result. In this case, the noteworthy characteristics are characterized in that data to be used for such map computation is generally high-capacity data and resultant data produced by the map computation is relatively-smaller-sized data (i.e., relatively-smaller-capacity data).

Whereas the memory system 10 according to the embodiment is designed to process high-capacity data as in map computation of the map-reduce application, the memory system 10 may also perform off-loading of low-reuse-rate computation using the accelerator 112 of the pooled memory controller (PMC) 110. In this case, the term "off-loading" may refer to a series of processes in which a request is received from each of the processors 20, necessary data is analyzed in response to the received request, necessary computation corresponding to the analyzed data is performed, and the computation result is finally output. In the case of processing data within the pooled memory 100, energy consumption needed to transfer data to the node CND of the processors 20 can be reduced and system performance can also be increased.

The accelerator 112 may be provided in the pooled memory controller (PMC) 110, or may be provided in each memory 120. From the viewpoint of near data processing, a method for processing near data using accelerators within each memory 120 may be more efficient than a method for processing near data using an accelerator within the pooled memory controller (PMC) 110.

In order to provide a high bandwidth, the pooled memory controller (PMC) 110 may perform memory interleaving. In this case, data may be stored in multiple memories 120 in a distributed manner. As a result, data needed for the accelerator 112 may also be stored in multiple memories 120 in the same distributed manner. The following embodiment will disclose an illustrative case in which the physical position of the accelerator 112 is arranged in the pooled memory controller (PMC) 110 for convenience of description, but embodiments are not limited thereto.

Information regarding the performance and energy efficiency benefits of the above-mentioned method for performing off-loading of a map computation of the map-reduce application using the accelerator 112 in the memory will hereinafter be described with reference to the attached drawings.

Assuming that computation to be performed by the accelerator 112 has computational complexity similar to the map computation of the map-reduce application, a computation time needed for the accelerator 112 may be dependent upon a bandwidth through which data is read from the corresponding memory. Therefore, the range of a bandwidth of the accelerator 112 may be increased, so that a computation time of the accelerator 112 can be reduced.

As illustrated in FIG. 3, the nodes (CND) of a series of processors 20 may be coupled to the pooled memory 100 through the fabric network 30. For convenience of description and better understanding of the present disclosure, it is assumed that each node CND includes a single link L1 for each processor 20, and the accelerator 112 provided in the pooled memory controller (PMC) 110 includes four links (L2). That is, a bandwidth of the links L2 of the accelerator 112 may be larger than that of the link L1 of each processor 20. As a result, when off-loading of a map computation or a similar computation is performed using the accelerator 112, a processing speed of off-loading of map computation may advantageously be, in this example, four times faster than that of the method for processing such off-loading through each processor 20.

When both map computation and reduce computation are carried out by each of the processors 20, it is assumed for purpose of illustration that a time consumed for the map computation occupies 99% of a total execution time. In addition, when multiple applications are carried out by only one processor 20, an execution time consumed by the map-reduce application may occupy about 10% of a total execution time of all applications. When off-loading of the map computation is performed using the accelerator 112, a map computation time is reduced by about ¼, such that total system performance may be improved by about 81%.

Figure 4:
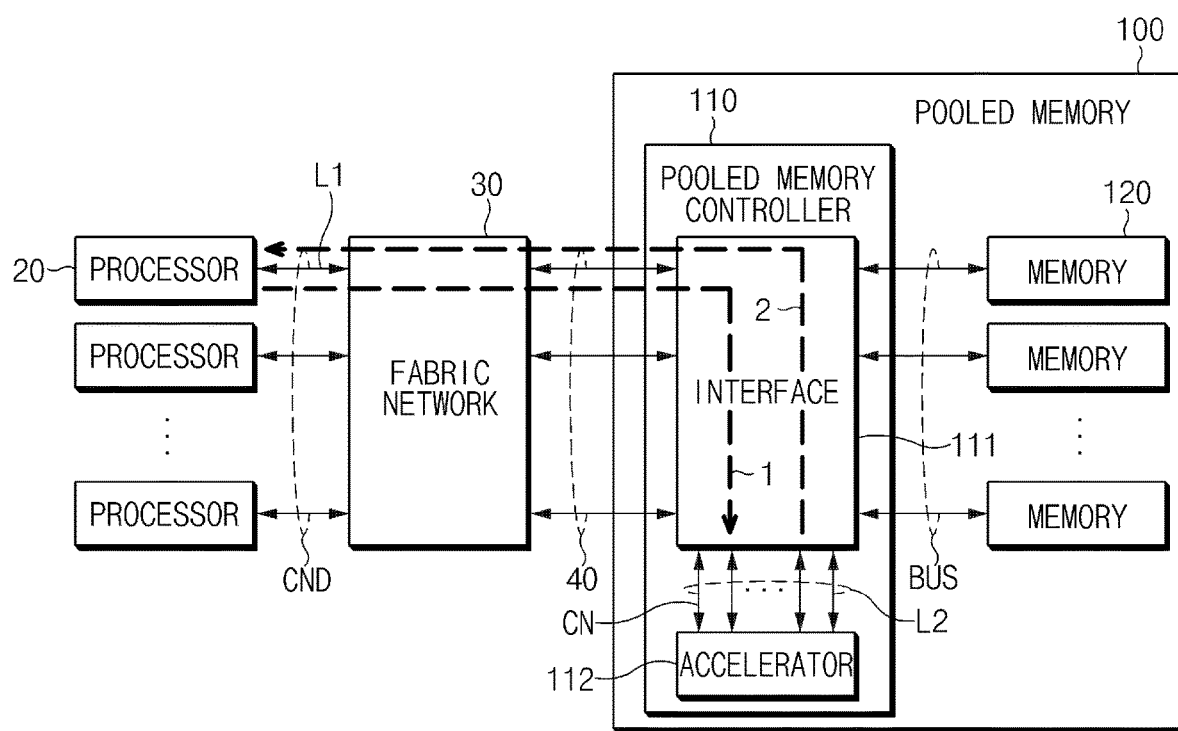
FIGS. 4, 5, and 6 illustrate operations of a memory system according to an embodiment of the present disclosure.
Figure 5:
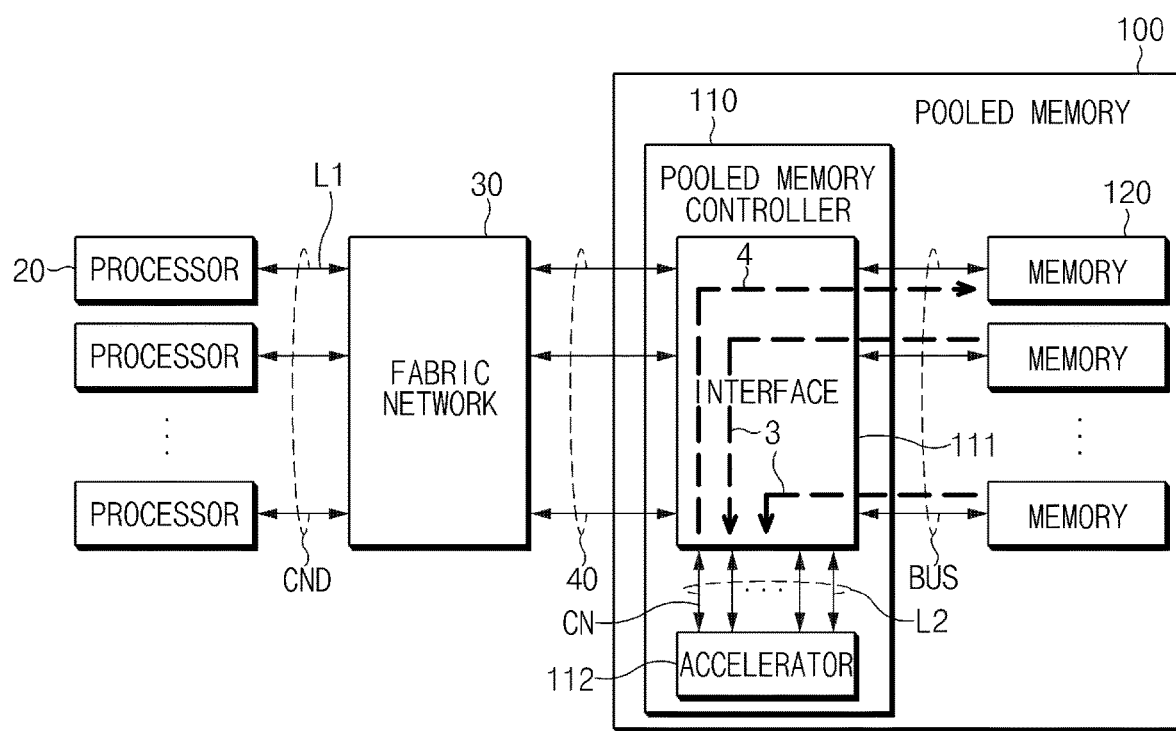
Figure 6:
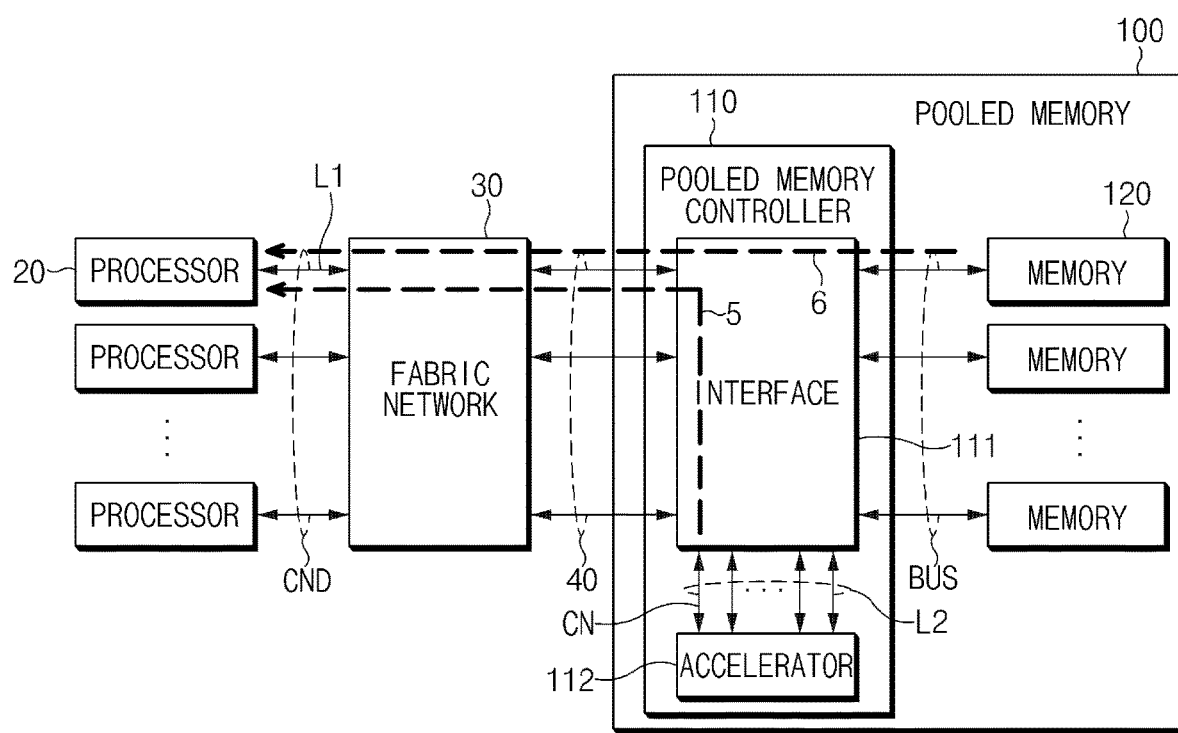

FIGS. 4, 5, and 6 are conceptual diagrams illustrating operations of the memory system 10 according to an embodiment of the present disclosure.

First of all, as illustrated by path 1 of FIG. 4, each of the processors 20 may transmit a packet requesting a map computation to the pooled memory 100. That is, the map computation request packet received from the processors 20 may be transmitted to the accelerator 112 after passing through the fabric network 30 and the interface 111 of the pooled memory controller (PMC) 110. The map computation request packet may include information about an address in which input data to be used for map computation is stored, information about the size of data, information about an address to be used for storing the map computation resultant data, and the like.

Subsequently, as illustrated by path 2 of FIG. 4, the pooled memory controller (PMC) 110 may transmit a map computation response packet to the processors 20 through the fabric network 30. That is, the pooled memory controller (PMC) 110 may transmit to the processor 20 a specific signal indicating that the accelerator 112 has properly received the map computation request packet.

Thereafter, as illustrated by path 3 shown in FIG. 5, the pooled memory controller (PMC) 110 may read input data needed for map computation from one or more memories (or each of the memories) 120, and may transmit the read input data to the accelerator 112. The input data required by the accelerator 112 may be distributed among the plurality of memories 120 and stored in the memories 120 in a distributed manner. In this case, the accelerator 112 may read input data from more than one of the plurality of memories 120 and may perform the map computation based on the input data read from the memories 120.

Subsequently, as illustrated by path 4 shown in FIG. 5, the pooled memory controller 110 may read the map computation resultant data produced by the accelerator 112, may transmit the read resultant data to each memory 120, and may store the transmitted resultant data in each memory 120. The map computation resultant data computed by the accelerator 112 may be distributed to the plurality of memories 120 and stored in the memories 120 in a distributed manner.

Thereafter, as illustrated by path 5 (see FIG. 6), the pooled memory controller (PMC) 110 may transmit through the fabric network 30 an interrupt packet or other signal to the processors 20 to indicate that the map computation performed by the accelerator 112 has been completed.

Then, as illustrated by path 6 (see FIG. 6), the pooled memory controller (PMC) 110 may read the resultant data stored in the memories 120, and may transmit the read resultant data to the processors 20 through the fabric network 30.

Figure 7:
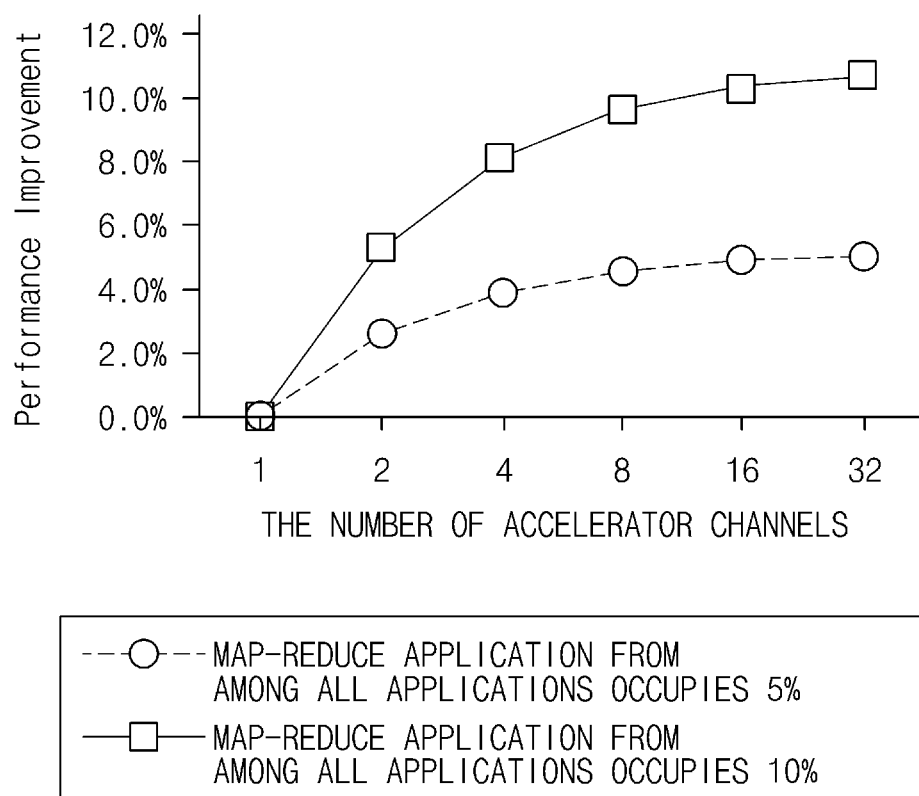
FIG. 7 is a view illustrating performance improvement of a memory system according to an embodiment of the present disclosure.

FIG. 7 illustrates performance improvements that may be obtained by using a memory system according to an embodiment of the present disclosure. In more detail, the graph of FIG. 7 shows that as the number of accelerator channels (CN) of the accelerator 112 used for map computation by the accelerator 112 increases, system performance is improved in proportion to the increase in the number of accelerator channels (CN).

As the number of accelerator channels (CN) of the accelerator 112 increases, system performance also increases in proportion to the increasing accelerator channels (CN), as shown in FIG. 7. However, the incremental improvement of system performance is gradually reduced as the number of accelerator channels (CN) is increased, whereas product costs needed to increase the number of accelerator channels (CN) continues to increase at substantially the same rate. Accordingly, embodiments may have a number of accelerator channels (CN) set to 2, 3, or 4 to optimize a cost-performance ratio. These numbers of accelerator channels are provided merely for illustrative convenience and are not intended to limit the embodiments thereto. For example, in other embodiments, the number of accelerator channels may be 5, 6, 7, 8, 9, 10, or more.

For purpose of illustration, it is assumed that energy of 1 pJ/bit (where "pJ" is a picojoule, a unit indicating energy) is consumed for each link L1 to transfer data through the node CND of each processor 20. In order to process data using each processor 20, the data to be processed must pass through a total of three links (i.e., a bus of each memory 120, a channel 40 of the fabric network 30, and the node CND of each processor 20), such that energy of 3 pJ/bit is consumed. However, when off-loading of map computation is performed using the accelerator 112, this data has only to pass through the bus of each memory 120, such that total energy to be consumed for such data transfer can be reduced to 1 pJ/bit corresponding to ⅓ of the energy of 3 pJ/bit. In order to determine how much system energy can be saved, the static power consumption of all hardware (H/W) circuits may also be considered.

As described above, the pooled memory 100 according to the embodiments of the present disclosure include a plurality of memories 120 and may provide a large storage capacity and a large bandwidth, and may be used to provide an in-memory database or the like. In an embodiment, the accelerator 112 is included in the pooled memory controller (PMC) 110 and off-loading of map computation of the Map-Reduce application is carried out using the accelerator 112, such that system performance can be increased and energy consumption can be reduced. In another embodiment, accelerators 112 may be added to each of the plurality of memories 120.

As is apparent from the above description, the memory system according to the embodiments of the present disclosure may increase system throughput or performance, and may reduce energy consumption needed for data computation.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, those skilled in the art will understand that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A memory system, comprising:
a plurality of memories configured to store data therein; and
a pooled memory controller configured to perform a map computation and storing resultant data of the map computation in the plurality of memories, wherein the pooled memory controller includes:
an interface configured to perform packet relay between at least one processor and at least one memory through a fabric network; and
an accelerator configured to perform the map computation by reading an input data received from the plurality of memories through the interface to produce the resultant data, wherein the accelerator is coupled to the interface through a plurality of channels;
wherein the interface transmits the read input data to the accelerator, and receives the resultant data computed by the accelerator, and transmits the received resultant data to the plurality of memories, and
wherein a number of links of the plurality of channels is higher than a number of links between the interface and any one of the processors.

2. The memory system according to claim 1, wherein the accelerator receives the input data through the plurality of channels and provides the resultant data to the interface through the plurality of channels.

3. The memory system according to claim 1, wherein the pooled memory controller is configured to receive a map computation request packet from the at least one processor through the interface.

4. The memory system according to claim 3, wherein the map computation request packet includes at least one of information about an address of the input data, information about a size of the input data, and information about an address to be used to store the resultant data.

5. The memory system according to claim 1, wherein the pooled memory controller is configured to transmit a map computation response packet to the at least one processor through the interface.

6. The memory system according to claim 1, wherein the pooled memory controller reads the input data from the plurality of memories, and transmits the read input data to the accelerator.

7. The memory system according to claim 1, wherein the interface receives the resultant data computed by the accelerator, and stores the received resultant data in the plurality of memories.

8. The memory system according to claim 1, wherein the pooled memory controller is configured to transmit an interrupt packet to the at least one processor through the interface in response to completion of the map computation.

9. The memory system according to claim 1, wherein the pooled memory controller reads the resultant data stored in the plurality of memories, and transmits the read resultant data to the at least one processor.

10. The memory system according to claim 1, wherein the pooled memory controller communicates with the one or more processors through a fabric network.

11. The memory system according to claim 1, wherein the pooled memory controller is configured to perform interleaving of data among the plurality of memories.

12. The memory system according to claim 1, wherein the pooled memory controller is configured to perform address remapping for the plurality of memories.

13. A memory system comprising:
a fabric network coupled to at least one processor; and
a pooled memory having a plurality of memories and a pooled memory controller, the pooled memory being configured to perform packet relay to the processor through the fabric network, and transmit data stored in at least one memory in response to a request from the processor,
wherein the pooled memory controller is configured to perform off-loading of a map computation by reading input data stored in the at least one memory and storing in the at least one memory resultant data of the map computation in the plurality of memories,
wherein the pooled memory controller includes:
an interface configured to perform packet relay between the at least one processor and the pooled memory controller through the fabric network, wherein the interface is coupled to the accelerator through a plurality of channels; and
an accelerator configured to perform the map computation and the off-loading of the map computation by reading an input data received from the plurality of memories through the interface to produce the resultant data, wherein the accelerator is coupled to the interface through a plurality of channels,
wherein the interface transmits the read input data to the accelerator, and receives the resultant data computed by the accelerator, and stores the received resultant data in the plurality of memories, and
wherein a number of links of the plurality of channels is higher than a number of links between the interface and any one of the processors.

14. The memory system according to claim 13, wherein the pooled memory controller receives a map computation request packet from the at least one processor through the interface, and transmits a map computation response packet to the at least one processor through the interface.

15. The memory system according to claim 13, wherein the pooled memory controller reads input data needed for the map computation from the at least one memory, transmits the read input data to the accelerator, and stores the resultant data produced by the accelerator in the at least one memory.

16. The memory system according to claim 13, wherein the pooled memory controller transmits an interrupt packet to the at least one processor through the interface in response to completion of the map computation, reads the resultant data stored in the at least one memory, and transmits the read resultant data to the at least one processor through the interface.

17. The memory system according to claim 13, wherein the pooled memory controller is configured to perform at least one of interleaving and address remapping for the at least one memory.

* * * * *